Feb. 16, 1943.   R. D. WINKELMEYER   2,311,427

GROMMET

Filed July 18, 1941

Inventor
Robert D. Winkelmeyer
By
Blackmore, Spencer & Rich
Attorneys

Patented Feb. 16, 1943

2,311,427

UNITED STATES PATENT OFFICE 2,311,427

GROMMET

Robert D. Winkelmeyer, Anderson, Ind., assignor to General Motors Corporation, Detroit, Mich., a corporation of Delaware Application July 18, 1941, Serial No. 403,008

2 Claims. (Cl. 16—108)

My invention relates to a grommet, such as is used to protect conductors passing through an opening in a sheet metal wall or housing.

A satisfactory grommet of this type must be one which is easily installed and which gives adequate protection to conductors passing through it; at the same time, it must serve as a seal to keep out objectionable dirt and dust.

It is therefore an object of my invention to provide a grommet of a yieldable substance such as live rubber which may be easily assembled and which serves to seal the isolated space effectively from dust and dirt.

More specifically, it is an object of my invention to provide a grommet consisting of a single piece of a yieldable material one end of which may be crimped or clamped by a deformable ring such as a metal band.

In the drawing, Figure 1 is a view with parts broken away and in section showing a grommet made according to my invention installed in an automobile headlamp housing.

Figure 1:
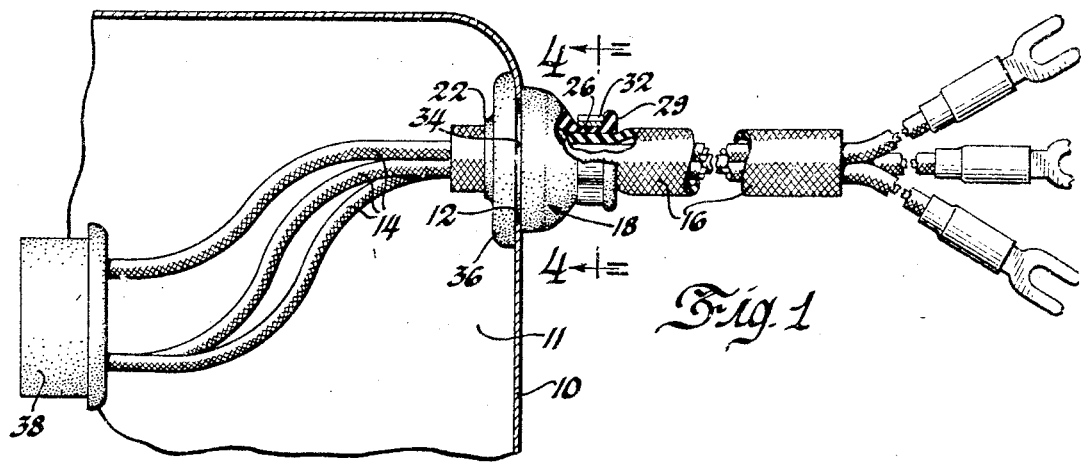

A wall or housing 10 enclosing space 11 and having an opening 12 is shown in Figure 1. Wires 14 encased in a loom 16 are shown as passing through opening 12. Loom 16 containing wires 14 is protected from the sharp edges of opening 12 by my invention, grommet 18.

Figure 2:
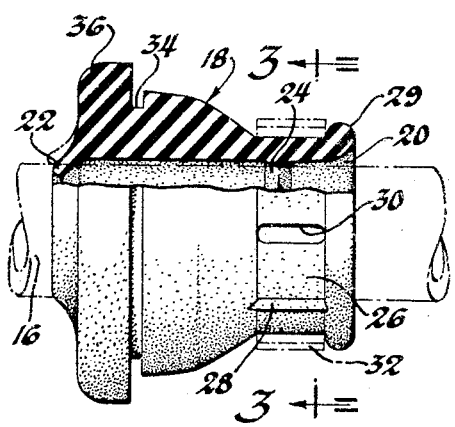
Figure 2 is a detail view with parts broken away and in section.
Figure 3:
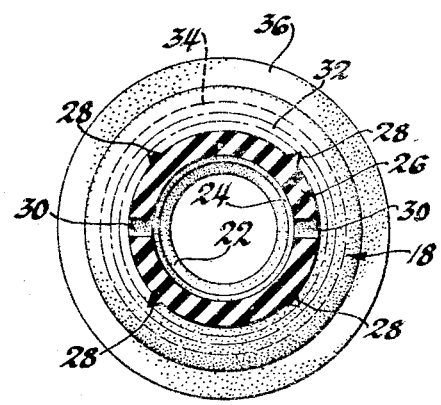
Figure 3 is a view in section substantially on the line 3—3 of Figure 2.

As best seen in Figure 2, my grommet comprises a truncated generally cone-shaped body having a substantially cylindrical opening 20 therein. At the large end of the body is an inwardly extending lip 22 which seals this end of the grommet by contact with loom 16. Near the opposite end of the opening I provide an inwardly extending circumferential ridge 24 which seals that end. On the outside of the body near this end I provide a substantially cylindrical portion 26, about the circumference of which I have spaced several small outwardly extending ribs 28. At the very end of the body member is a flange 29. I also provide slots 30 in the circumference of the body member at this portion of the grommet. The tips of outwardly extending ribs 28 may be inscribed in a circle which is the inside diameter of a clamp or crimping ring or band 32 shown in dotted lines in Figures 2 and 3.

Near the large end of the body member I provide a groove 34 and a flange 36. Groove 34 is adapted to receive the edges of opening 12 in which my grommet fits. This groove may be made substantially watertight so as to exclude dirt and moisture from the space 11.

In the use of my grommet it will be seen that its shape is such as to facilitate its insertion in opening 12 by pushing the small end through the opening and deforming the grommet to permit the edge of opening 12 to drop into groove 34. My grommet may be made of any readily deformable substance having the desired properties, but I prefer to make it of live rubber which has enough stiffness to support itself in opening 12 but which may nevertheless be quite readily deformed to permit its installation. The material from which my grommet is made is of course not a part of this invention and those skilled in the art will be aware of substances other than rubber which can be used satisfactorily.

Figure 4:
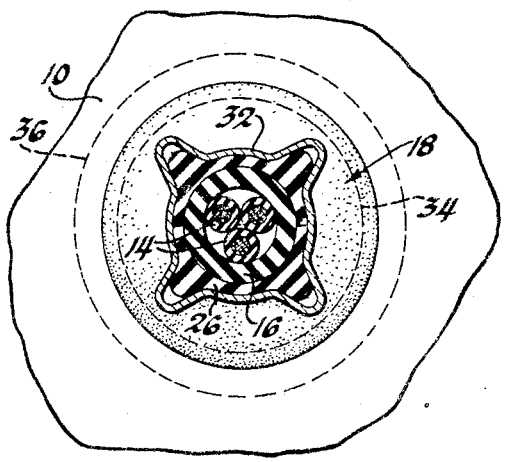
Figure 4 is a view in section substantially on the line 4—4 of Figure 1.

After my grommet has been pushed into place in the opening in wall 10 the conductors 14 encased in loom 16 may be pushed through from the small end of the grommet. Conductors 14 will be connected with any suitable terminal such as lamp socket 38 within the space 11. As seen in Figure 1, inwardly extending lip 22 is pressed outward by loom 16 to provide a relatively tight seal at the large end of the grommet. After the loom and wires have been installed, ring or band 32 is slipped into position, as shown by the dotted lines of Figures 2 and 3. Band or ring 32 may be of any suitable material which may be readily deformed and which will retain its deformed shape. I prefer to use a metal band which I may deform or crimp by a tool designed for the purpose into the shape shown in Figure 4. This deformation or crimping clamps cylindrical portion 26 of my grommet securely about the loom extending therethrough. Circumferential ridge 24 assists in effecting a tight seal between grommet 18 and loom 16.

It will be evident to those skilled in the art that I have here provided a grommet which may be easily installed which is simple in design and easily manufactured, and which effectually seals the space into which the conductors pass against dirt and moisture.

I claim:

1. In combination, a grommet of resilient material having an opening formed therein through which a member is adapted to extend, said grommet having a reduced portion adjacent one end with an annular ridge inside the opening at the reduced portion, and a band encircling said reduced portion, said band being adapted to be deformed to compress the reduced portion whereby said annular ridge will be forced into gripping contact with the member.

2. In combination, a grommet of resilient material having an opening formed therein through which a member is adapted to extend, said grommet having a reduced portion adjacent one end, a plurality of slots extending through said reduced portion to increase its yieldability, and a band encircling the reduced portion, said band being adapted to be crimped around the reduced portion to compress the latter into tight contact with the member.

ROBERT D. WINKELMEYER.